US011586294B2

(12) United States Patent
Ibaraki

(10) Patent No.: US 11,586,294 B2
(45) Date of Patent: Feb. 21, 2023

(54) VIDEO DISPLAY APPARATUS, METHOD FOR CONTROLLING VIDEO DISPLAY APPARATUS, AND PROGRAM

(71) Applicant: JVCKENWOOD Corporation, Yokohama (JP)

(72) Inventor: Takeshi Ibaraki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/531,234

(22) Filed: Nov. 19, 2021

(65) Prior Publication Data

US 2022/0171467 A1  Jun. 2, 2022

(30) Foreign Application Priority Data

Dec. 2, 2020 (JP) .............................. JP2020-200173

(51) Int. Cl.
*G06F 3/01* (2006.01)
*H04N 5/232* (2006.01)

(52) U.S. Cl.
CPC ......... *G06F 3/017* (2013.01); *H04N 5/23238* (2013.01)

(58) Field of Classification Search
None
See application file for complete search history.

(56) References Cited

U.S. PATENT DOCUMENTS

| 8,223,088 | B1* | 7/2012 | Gomez | G06F 3/011 345/7 |
| 10,607,084 | B1* | 3/2020 | Tang | G06T 7/20 |
| 2010/0060722 | A1* | 3/2010 | Bell | G06T 13/40 348/E13.001 |
| 2012/0317484 | A1* | 12/2012 | Gomez | G06F 3/03547 715/716 |
| 2015/0126268 | A1* | 5/2015 | Keilwert | G07F 17/3206 463/23 |
| 2015/0244772 | A1* | 8/2015 | Stalman | H04L 67/02 709/203 |
| 2016/0080684 | A1* | 3/2016 | Farrell | H04N 5/77 386/227 |
| 2017/0324624 | A1* | 11/2017 | Taine | H04L 67/535 |
| 2019/0354765 | A1* | 11/2019 | Chan | H04N 21/21805 |

(Continued)

FOREIGN PATENT DOCUMENTS

JP  2017083916 A  5/2017

*Primary Examiner* — Parul H Gupta

(74) *Attorney, Agent, or Firm* — Procopio, Cory, Hargreaves & Savitch LLP

(57) ABSTRACT

A video display apparatus according to an embodiment includes a video display unit configured to display a video image in a field of view of a user in a state in which the user is wearing the video display apparatus, an image pickup unit configured to take a video image of an outside state, a switching unit configured to selectively perform switching as to whether to display a video image of a certain content or a video image taken by the image pickup unit, and a switching control unit configured to control the switching unit. The switching control unit switches the video image displayed on the video display unit when an object with a predetermined identification pattern is included in the video image taken by the image pickup unit and the switching control unit has detected that a user's hand has made a predetermined gesture.

3 Claims, 11 Drawing Sheets

(56) References Cited

U.S. PATENT DOCUMENTS

| | | | |
|---|---|---|---|
| 2020/0236278 A1* | 7/2020 | Yeung | H04N 21/44016 |
| 2020/0388068 A1* | 12/2020 | Yeung | H04N 13/388 |
| 2021/0037168 A1* | 2/2021 | Mathur | H04L 65/80 |
| 2022/0072379 A1* | 3/2022 | Putnam | A61B 5/7267 |

* cited by examiner

SWITCH FROM CONTENTS TO VIDEO IMAGE
TAKEN BY IMAGE PICKUP UNIT

VIDEO DISPLAY APPARATUS, METHOD FOR CONTROLLING VIDEO DISPLAY APPARATUS, AND PROGRAM

CROSS REFERENCE TO RELATED APPLICATION

This application is based upon and claims the benefit of priority from Japanese patent application No. 2020-200173, filed on Dec. 2, 2020, the disclosure of which is incorporated herein in its entirety by reference.

BACKGROUND

The present disclosure relates to a video display apparatus, a method for controlling a video display apparatus, and a program.

In recent years, progress in the development of a video display apparatus as a type of display apparatus has been made. Japanese Unexamined Patent Application Publication No. 2017-83916 discloses a technology related to a head-mounted display that guides a user so that he/she can intuitively correct the position of his/her gesture.

SUMMARY

A non-transmission type video display apparatus has an advantage that a user can be immersed in the viewing of the contents thereof. However, it is difficult for the user to eat or drink in a state in which he/she is wearing the video display apparatus and is viewing the contents because his/her outside view is blocked.

For example, a camera is mounted on the video display apparatus, and the camera takes an image of a user's gesture and the gesture is recognized from the taken image. Further, by switching the video image displayed on the video display apparatus from the video image of contents to the video image taken by the camera at a timing at which a specific gesture is detected, the user can see the video image of the outside and thereby can eat or drink. However, in the method in which the user's gesture is recognized from the taken image and the displayed video image is switched, there is a possibility that the displayed video image could be switched at a timing that is not intended by the user.

A first exemplary aspect is a video display apparatus including: a video display unit configured to display a video image in a field of view of a user; an image pickup unit configured to take a video image of an outside state; a switching unit configured to selectively perform switching as to whether to display a first video image or a second video image on the video display unit, the first video image being a video image of a certain content, and the second video image being the video image taken by the image pickup unit; and a switching control unit configured to control the switching unit, wherein the switching control unit switches the video image displayed on the video display unit when an object with a predetermined identification pattern is included in the video image taken by the image pickup unit and the switching control unit has detected that a user's hand has made a predetermined gesture.

Another exemplary aspect is a method for controlling a video display apparatus including: displaying a video image in a field of view of a user; taking an image of an outside state by using an image pickup unit; and switching, when an object with a predetermined identification pattern is included in the video image taken by the image pickup unit and it is detected that a user's hand has made a predetermined gesture, a video image to be displayed in the field of view of the user to one of a first video image and a second video image that corresponds to the detected gesture, the first video image being a video image of a certain content, and the second video image being the video image taken by the image pickup unit.

Another exemplary aspect is a program for causing a computer provided in a video display apparatus to perform processes including: displaying a video image in a field of view of a user; taking an image of an outside state by using an image pickup unit; and switching, when an object with a predetermined identification pattern is included in the video image taken by the image pickup unit and it is detected that a user's hand has made a predetermined gesture, a video image to be displayed in the field of view of the user to one of a first video image and a second video image that corresponds to the detected gesture, the first video image being a video image of a certain content, and the second video image being the video image taken by the image pickup unit.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Embodiments according to the present disclosure will be explained with reference to the drawings.

Figure 1:
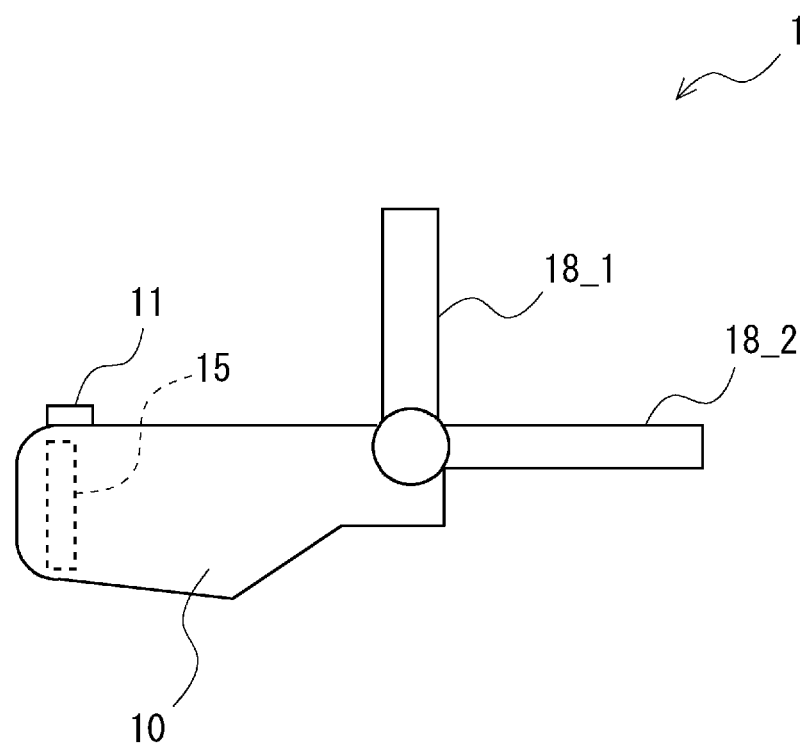
FIG. 1 is a side view of the video display apparatus according to a first embodiment.
Figure 2:
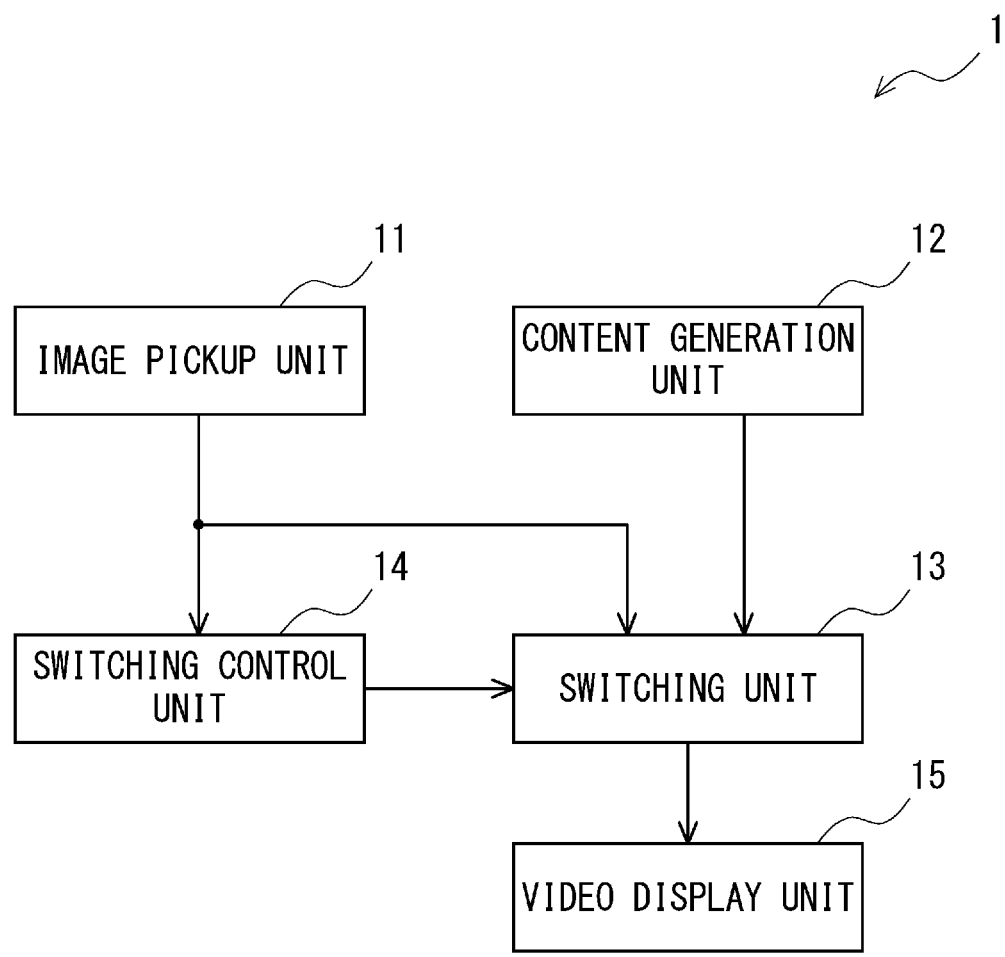
FIG. 2 is a block diagram of a system configuration of a video display apparatus according to the first embodiment.

FIG. 1 is a side view of a video display apparatus according to a first embodiment. As shown in FIG. 1, the video display apparatus (head-mounted display) 1 includes a main body part 10 and wearing parts 18_1 and 18_2. The wearing parts 18_1 and 18_2 are components for fixing the main body part 10 to the head of a user, and can be formed by using, for example, a belt or the like. The main body part 10 constitutes the main body of the video display apparatus 1, and various components of the video display apparatus, i.e., the components shown in FIG. 2, are mounted thereon.

A video display unit 15 is provided in (or attached to) the front part of the main body part 10 (on the left side in the drawing). The video display unit 15 displays a video image in the field of view of the user in a state in which the user is wearing the video display apparatus 1. The video display unit 15 can be formed by using, for example, a liquid crystal panel, an organic EL (Electro Luminescence) panel, or the like.

An image pickup unit 11 is provided in the main body part 10. The image pickup unit 11 takes a video image of the outside state. Specifically, the image pickup unit 11 takes a video image of a view in the viewing direction of the user (i.e., the direction in which the user is looking) who is wearing the video display apparatus 1 (i.e., in the left direction in the drawing). The image pickup unit 11 can be formed by using a camera including an image pickup device such as a CCD (Charge-Coupled Device) image sensor or a CMOS (Complementary Metal Oxide Semiconductor) image sensor. Note that the image pickup unit 11 may be provided in any part of the main body part 10 or in a part other than the main body part 10 as long as it can take a video image in the viewing direction of the user.

Further, the video display apparatus 1 also includes a sound output unit (not shown) such as a speaker(s) or an earphone(s). Therefore, by wearing the video display apparatus 1, the user can view (i.e., watch and listen to) contents by using the video image displayed in the video display unit 15 and the sound output from the sound output unit. Further, the video display unit 15 is configured so as to be able to display a video image taken by the image pickup unit 11.

FIG. 2 is a block diagram showing a system configuration of the video display apparatus according to this embodiment. As shown in FIG. 2, the video display apparatus 1 according to this embodiment includes the image pickup unit 11, a content generation unit 12, a switching unit 13, a switching control unit 14, and the video display unit 15.

The image pickup unit 11 takes a video image of an outside state and supplies the taken data to the switching unit 13 and the switching control unit 14. Note that since the details of the image pickup unit 11 have already been described above, the description thereof is omitted.

The content generation unit 12 generates contents to be displayed in the video display unit 15 and supplies data of the generated contents to the switching unit 13. For example, the content generation unit 12 may generate contents by playing back contents recorded in a memory (not shown) of the video display apparatus 1. Alternatively, the content generation unit 12 may generate contents by playing back contents received through a communication unit (not shown) of the video display apparatus 1, i.e., contents transferred from other apparatuses. Note that the method for generating contents performed in the content generation unit 12 is not limited to the above-described methods, and contents may be generated by using other methods.

The switching unit 13 selectively performs switching as to whether to display the contents (a first video image) generated by the content generation unit 12 in the video display unit 15, or display the video image (a second video image) taken by the image pickup unit 11 in the video display unit 15.

The switching control unit 14 controls the switching unit 13. Specifically, the switching control unit 14 performs image recognition for the video image taken by the image pickup unit 11. Then, when an object with a predetermined identification pattern is included in the video image taken by the image pickup unit 11 and the switching control unit 14 has detected that a user's hand has made a predetermined gesture, the switching control unit 14 switches the video image to be displayed in the video display unit 15. Note that the content generation unit 12, the switching control unit 14, and the switching unit 13 cooperate with a program(s), and are implemented by a CPU (Central Processing Unit) or the like.

The video display unit 15 displays one of the video image of the contents generated by the content generation unit 12 and the video image taken by the image pickup unit 11 that is selected by the switching unit 13. Note that the details of the video display unit 15 have already been described above, the description thereof is omitted.

Figure 3:
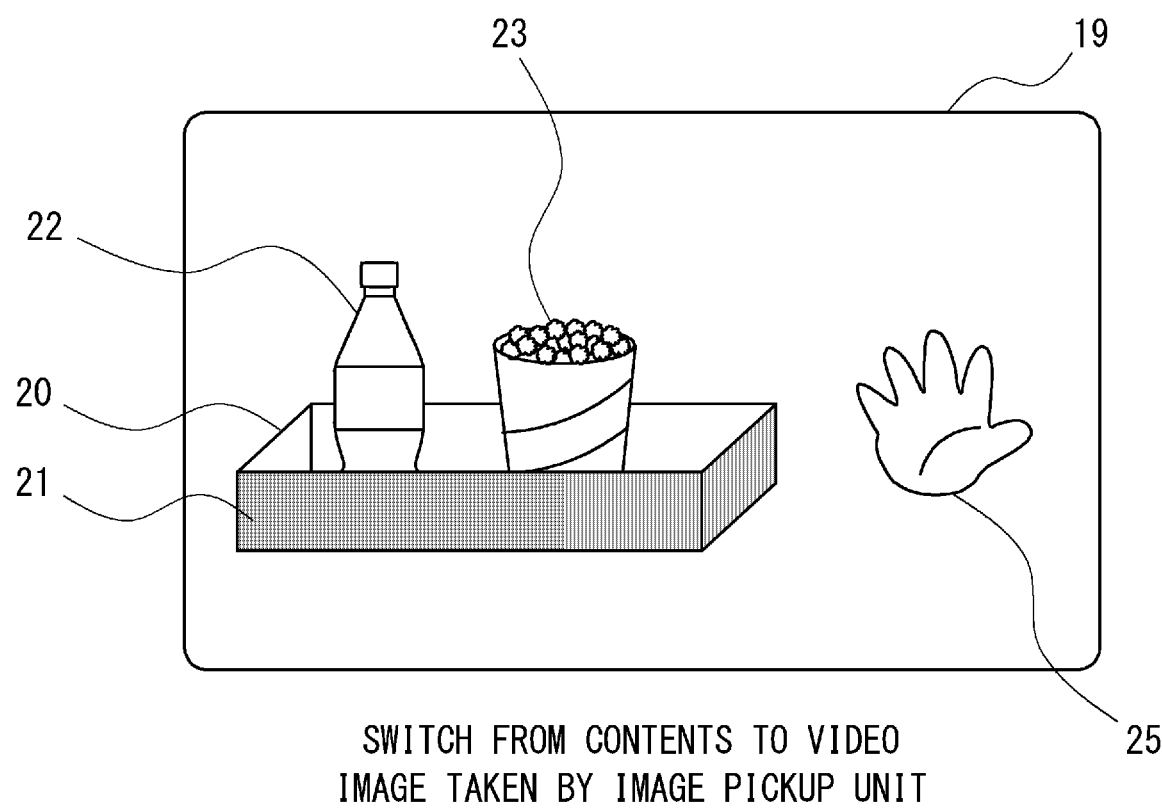
FIG. 3 is a drawing for explaining switching control performed by the video display apparatus according to the first embodiment.

The switching control performed by the switching control unit 14 will be described hereinafter in detail. As shown in FIG. 3, the switching control unit 14 performs image recognition for a video image 19 taken by the image pickup unit 11. Specifically, when a utensil (a tray) 20 decorated with a specific identification pattern 21 is included (i.e., shown) in the video image 19 taken by the image pickup unit 11, the switching control unit 14 recognizes that an object with a predetermined identification pattern 21 is included in the video image 19 taken by the image pickup unit 11. Note that the identification pattern 21 is a specific identification pattern registered in advance, and is registered in advance in a program for image recognition performed by the switching control unit 14 so that the identification pattern 21 is recognized from the image by the switching control unit 14. Further, identification patterns may be machine-learned in advance in order to increase the accuracy of the image recognition, and/or objects (such as utensils) may be machine-learned in advance. Note that a drink 22 and food 23 are placed on the utensil 20.

Further, when a user's hand 25 is included in the video image 19 taken by the image pickup unit 11 and the user's hand 25 has made a predetermined gesture, the switching control unit 14 detects the predetermined gesture. For example, there are a plurality of patterns of gestures, and each of the gestures and its corresponding type of switching control are registered in the program for the image recognition performed by the switching control unit 14.

In the example shown in FIG. 3, the switching control unit 14 has already recognized the utensil 20 decorated with the specific identification pattern 21, and also already detected the gesture made by the user's hand 25, so that the switching control unit 14 performs a switching operation corresponding to the gesture made by the user's hand 25. For example, when the switching control corresponding to the "opened hand" gesture is control for switching from the video image of the contents to the video image taken by the image pickup unit 11, the switching control unit 14 performs, in the example shown in FIG. 3, the control for switching the video image displayed in the video display unit 15 from the video image of the contents to the video image taken by the image pickup unit 11. Since the video image taken by the image pickup unit 11 is displayed in the video display unit 15 as described above, the user can eat and drink while visually recognizing (i.e., seeing) the drink 22 and the food 23 placed on the utensil 20. Note that, in the example shown in FIG. 3, an example in which the drink 22 and the food 23 are placed on the utensil 20 is shown. However, in this embodiment, for example, any object that the user wants to use, such as a mobile phone, may be placed on the utensil 20.

Figure 4:
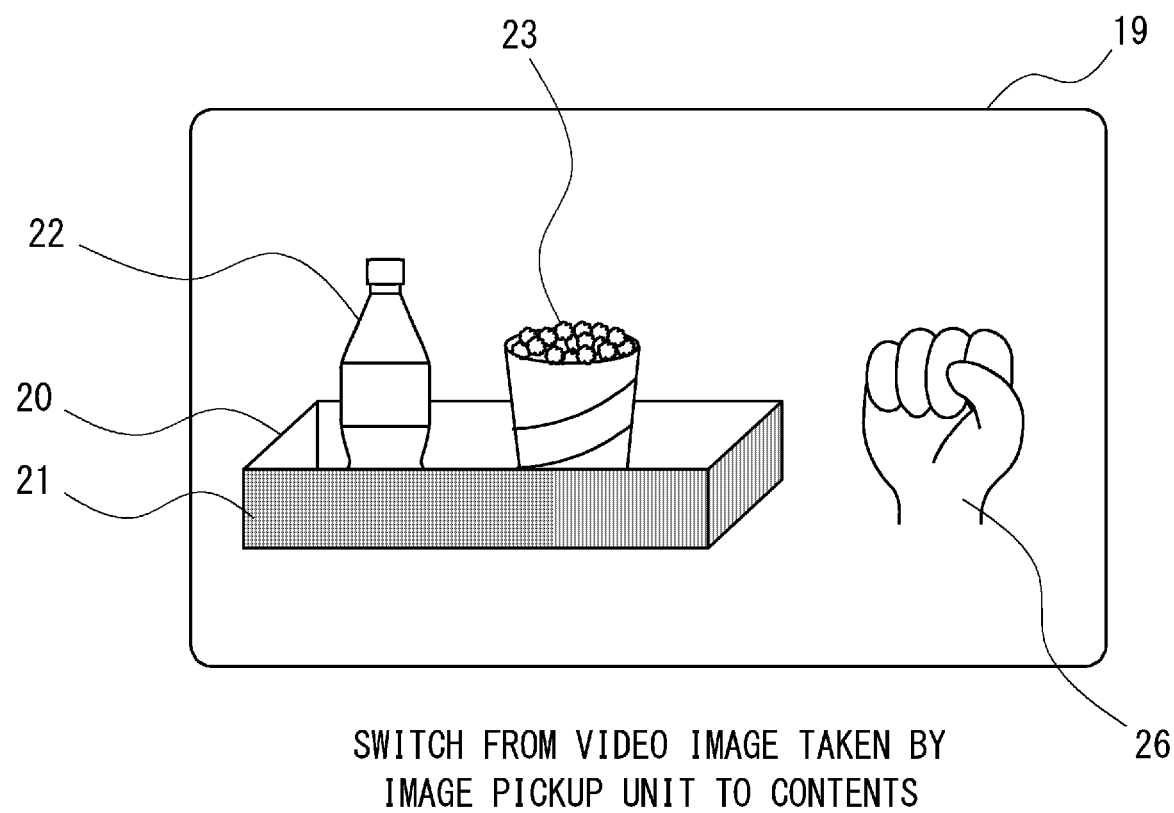
FIG. 4 is a drawing for explaining switching control performed by the video display apparatus according to the first embodiment.

Further, in the example shown in FIG. 4, since the switching control unit 14 has already recognized the utensil 20 decorated with the specific identification pattern 21, and also already detected a gesture made by a user's hand 26, the switching control unit 14 performs switching control corresponding to the gesture made by the user's hand 26. For example, when the switching control corresponding to the "closed hand" gesture is control for switching from the video image taken by the image pickup unit 11 to the video image of the contents, the switching control unit 14 performs, in the example shown in FIG. 4, the control for switching the video image displayed in the video display unit 15 from the video image taken by the image pickup unit 11 to the video image of the contents. By switching the video image displayed in the video display unit 15 from the video image taken by the image pickup unit 11 to the video image of the contents as described above, the user can view (i.e., watch and listen to) the video image of the contents again.

Figure 5:
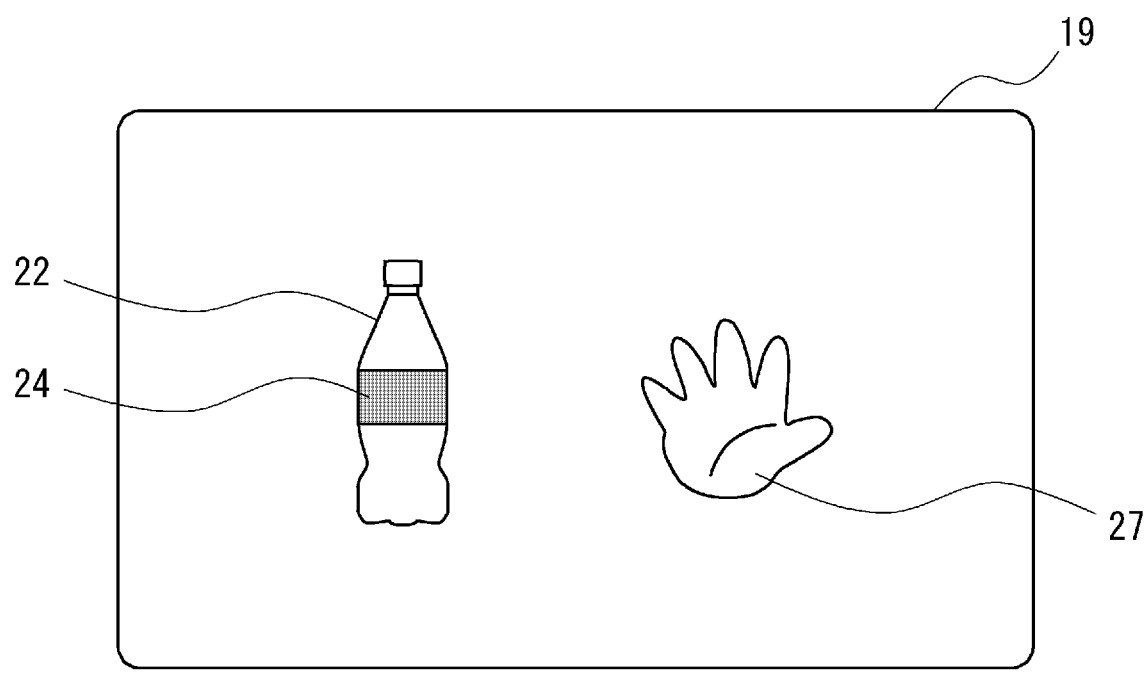
FIG. 5 is a drawing for explaining switching control performed by the video display apparatus according to the first embodiment.

Note that although FIGS. 3 and 4 show an example in which the specific identification pattern 21 is provided in the utensil 20, the place where the specific identification pattern is provided is not limited to the utensil 20 in this embodiment. For example, as shown in FIG. 5, an identification pattern 24 may be provided in the container (e.g., the plastic bottle) of the drink 22. That is, the identification pattern 24 may be directly provided in the object to be identified. The identification pattern 24 may be provided, for example, by affixing a sticker with the identification pattern 24 printed thereon to the object.

In the case shown in FIG. 5, since the switching control unit 14 has already recognized the identification pattern 24 provided in the container of the drink 22, and also already detected a gesture made by a user's hand 27, the switching control unit 14 performs switching control corresponding to the gesture made by the user's hand 27. Since the gesture shown in FIG. 5 is an "opened hand", the switching control unit 14 performs control for switching the video image displayed in the video display unit 15 from the video image of the contents to the video image taken by the image pickup unit 11.

Figure 6:
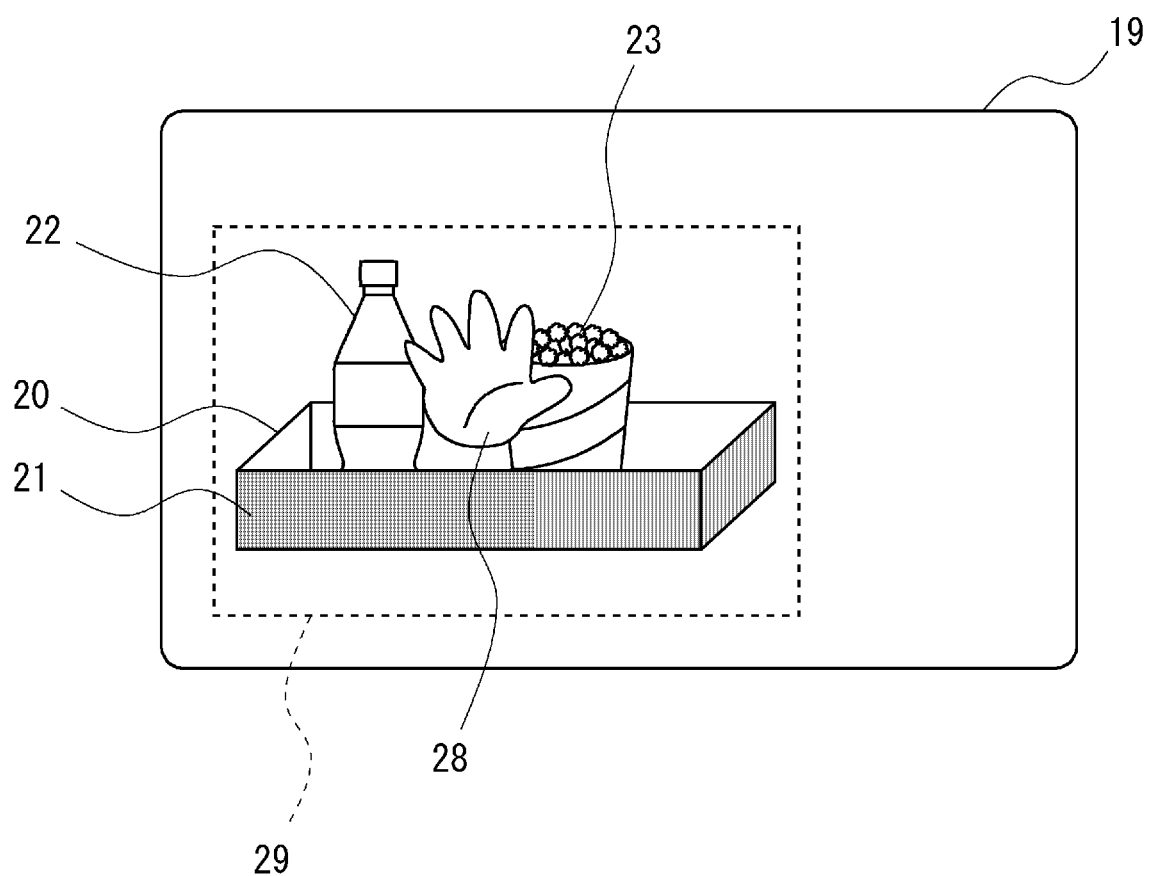
FIG. 6 is a drawing for explaining switching control performed by the video display apparatus according to the first embodiment.

Further, in this embodiment, the switching control unit 14 may switch the video image displayed in the video display unit 15 when it has detected a gesture made by the user within a predetermined range in the video image taken by the image pickup unit 11. That is, as shown in FIG. 6, a predetermined range 29 may be set by using the specific identification pattern 21 as a reference point. Then, when the switching control unit 14 has detected a gesture made by a user's hand 28 within this predetermined range 29, it may switch the video image displayed in the video display unit 15.

In the case shown in FIG. 6, since the switching control unit 14 has already recognized the utensil 20 decorated with the specific identification pattern 21, and also already detected a gesture made by a user's hand 28 within the predetermined range 29, the switching control unit 14 performs switching control corresponding to the gesture made by the user's hand 28. Since the gesture shown in FIG. 6 is an "opened hand", the switching control unit 14 performs control for switching the video image displayed in the video display unit 15 from the video image of the contents to the video image taken by the image pickup unit 11. When the predetermined range 29 is set as described above, it is possible to reduce the range in which a gesture is detected to a specific range, and thereby to prevent false detection of a gesture. Note that, in the switching control unit 14, the predetermined range 29 can be set by using the identification pattern 21 as a reference point. Note that the size and the place of the predetermined range 29 can be arbitrarily determined. Further, the predetermined range can be set by using the identification pattern 24 shown in FIG. 5 as a reference point.

Figure 7:
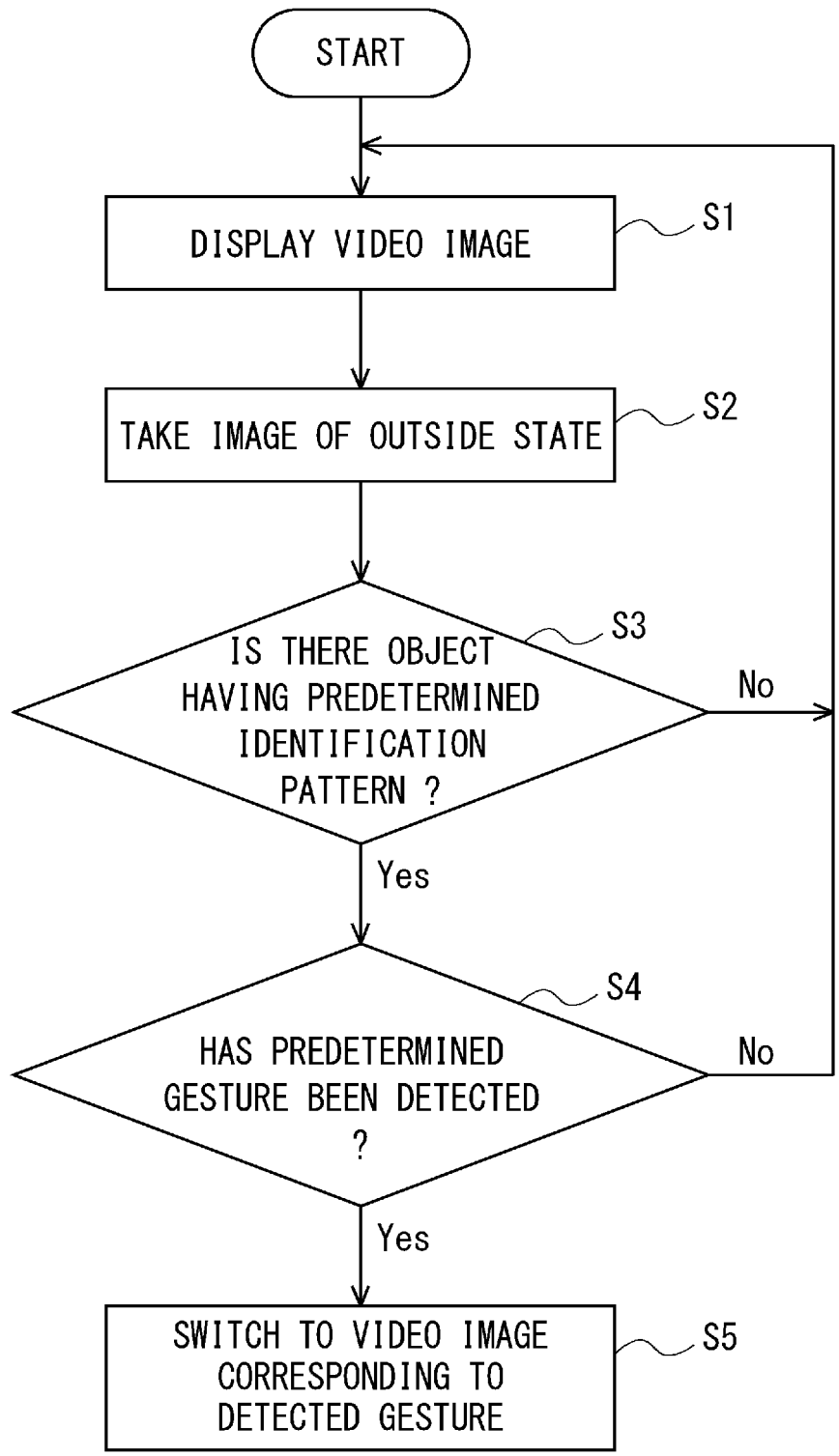
FIG. 7 is a flowchart for explaining operations performed by the video display apparatus according to the first embodiment.

Next, operations performed by the video display apparatus according to this embodiment will be described with reference to a flowchart shown in FIG. 7.

Firstly, a video image is displayed in the video display unit 15 in a state where the user is wearing the video display apparatus 1 (Step S1). Further, the image pickup unit 11 takes a video image of the outside state (Step S2). That is, the image pickup unit 11 takes a video image in the viewing direction of the user (i.e., the direction in which the user is looking) who is wearing the video display apparatus 1. The operations in the steps S1 and S2 are performed in parallel with each other at all times. That is, either the video image of certain contents or the video image taken by the image pickup unit 11 is displayed in the video display unit 15.

Next, the switching control unit 14 performs image recognition for the video image taken by the image pickup unit 11. Then, when an object with a predetermined identification pattern is included (i.e., shown) in the video image taken by the image pickup unit 11 (Step S3: Yes), and the switching control unit 14 has detected that a user's hand has made a predetermined gesture (Step S4: Yes), the switching control unit 14 switches the video image to be displayed in the field of view of the user to one of the video image of the certain contents and the video image taken by the image pickup unit 11 that corresponds to the detected gesture (Step S5). On the other hand, when no object with a predetermined identification pattern is included (i.e., shown) in the video image taken by the image pickup unit 11 (Step S3: No), the process returns to the process in the step S1. Further, when no predetermined gesture made by the user's hand is detected (Step S4: No), the process returns to the process in the step S1.

Note that the order of the processes in the steps S3 and S4 may be reversed. Further, the specific operations of the switching control performed by the switching control unit 14 (Steps S3 to S5) are the same as those in the above-described case shown in FIG. 3 to FIG. 6.

As explained above, in the video display apparatus according to this embodiment, when an object with a predetermined identification pattern is included in the video image taken by the image pickup unit 11, and it is detected that a user's hand has made a predetermined gesture, the video image displayed in the video display unit 15 is switched. That is, since the detection of a predetermined identification pattern, in addition to the detection of a gesture, is also used as a condition for switching the video image, it is possible to prevent the video image from being switched at a timing that is not intended by the user. Further, since the detection of a predetermined identification pattern and the detection of a predetermined gesture are used as conditions for switching the video image, the video image can be easily switched.

Second Embodiment

Next, a second embodiment according to the present disclosure will be described.

FIGS. 8 to 11 are drawings for explaining operations performed by a video display apparatus according to the second embodiment. The operations performed by the switching control unit 14 of the video display apparatus according to the second embodiment differs from those performed by the switching control unit 14 of the video display apparatus according to the first embodiment. The rests of the configuration of the video display apparatus and the operations performed thereby are similar to those of the video display apparatus according to the first embodiment, and therefore redundant descriptions thereof are omitted.

In the video display apparatus according to this embodiment, the switching control unit 14 displays the video image taken by the image pickup unit 11 in such a manner that the video image taken by the image pickup unit 11 is superimposed on the video image of the contents at a timing at which the switching control unit 14 starts to detect a user's hand in the shooting range of the image pickup unit 11. Then, when the switching control unit 14 has detected that the user's hand has made a predetermined gesture within a predetermined range in the video image taken by the image pickup unit 11, it displays the video image taken by the image pickup unit 11 in the video display unit 15. Detailed descriptions will be given hereinafter with reference to a specific example shown in FIGS. 8 to 11.

Figure 8:
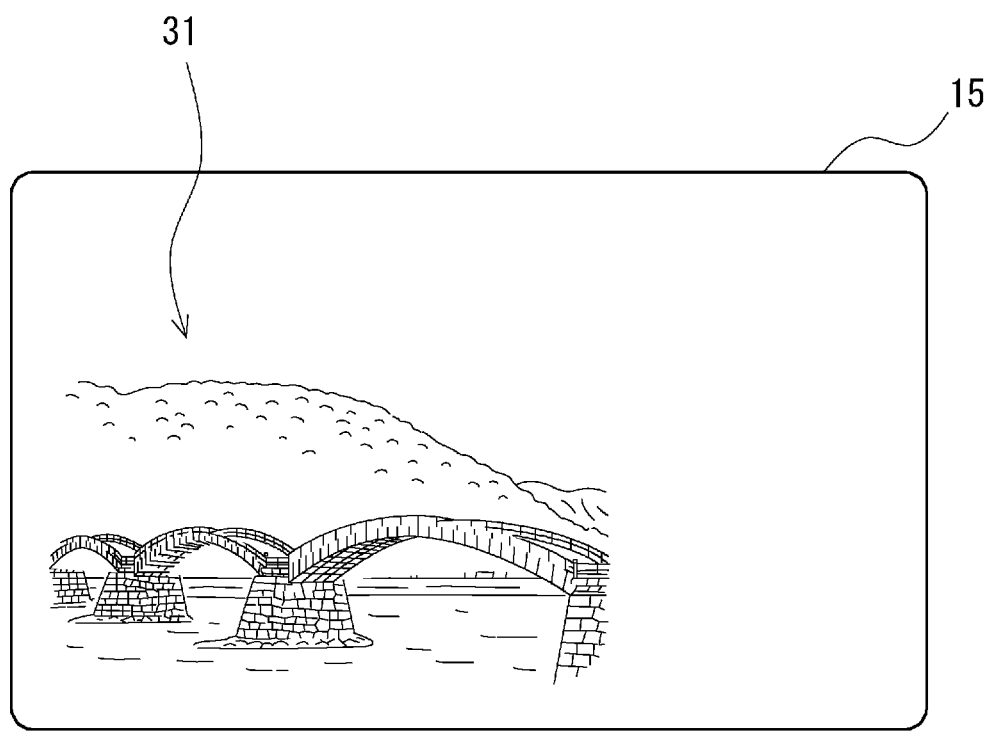
FIG. 8 is a drawing for explaining operations performed by a video display apparatus according to a second embodiment.

When a user is viewing a video image of contents by using the video display apparatus 1 that the user is wearing, a content video image 31 is displayed in the video display unit 15 as shown in FIG. 8. In this state, the image pickup unit 11 is taking a video image of a view in the viewing direction of the user (i.e., the direction in which the user is looking) who is wearing the video display apparatus 1.

Figure 9:
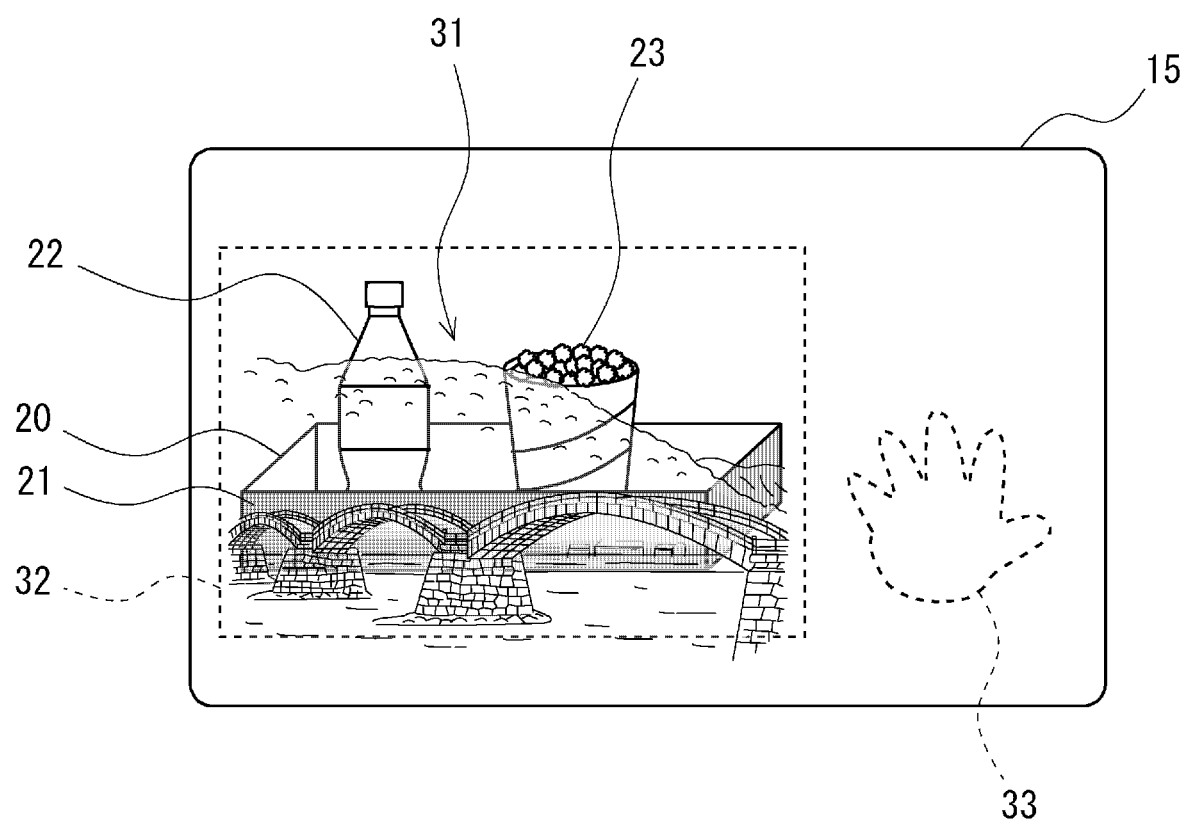
FIG. 9 is a drawing for explaining operations performed by the video display apparatus according to the second embodiment.

Then, as shown in FIG. 9, when the image pickup unit 11 starts to detect a user's hand 33 in the shooting range of the image pickup unit 11, the switching control unit 14 displays the video image taken by the image pickup unit 11 while superimposing it on the content video image 31. That is, a video image of a utensil 20 decorated with a specific identification pattern 21, and a drink 22 and food 23 placed on the utensil 20 are displayed in such a manner that the video image of them is superimposed on the content video image 31.

Figure 10:
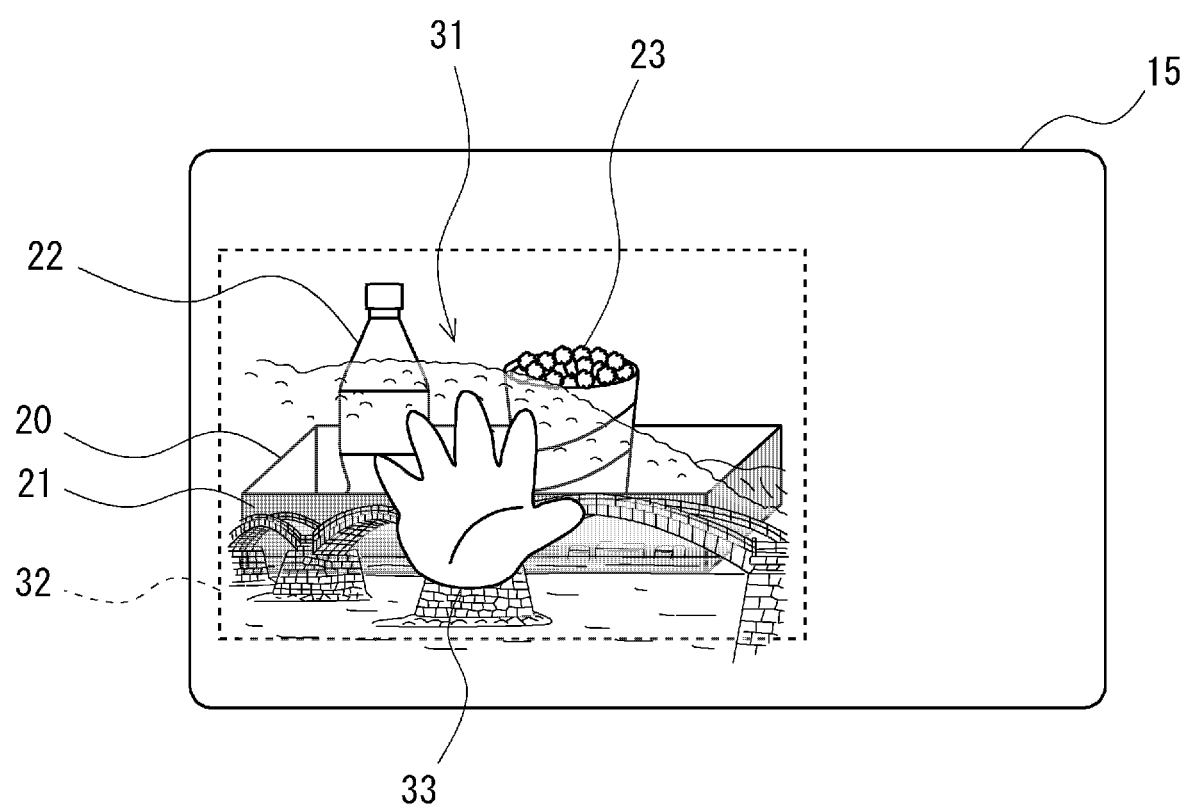
FIG. 10 is a drawing for explaining operations performed by the video display apparatus according to the second embodiment.
Figure 11:
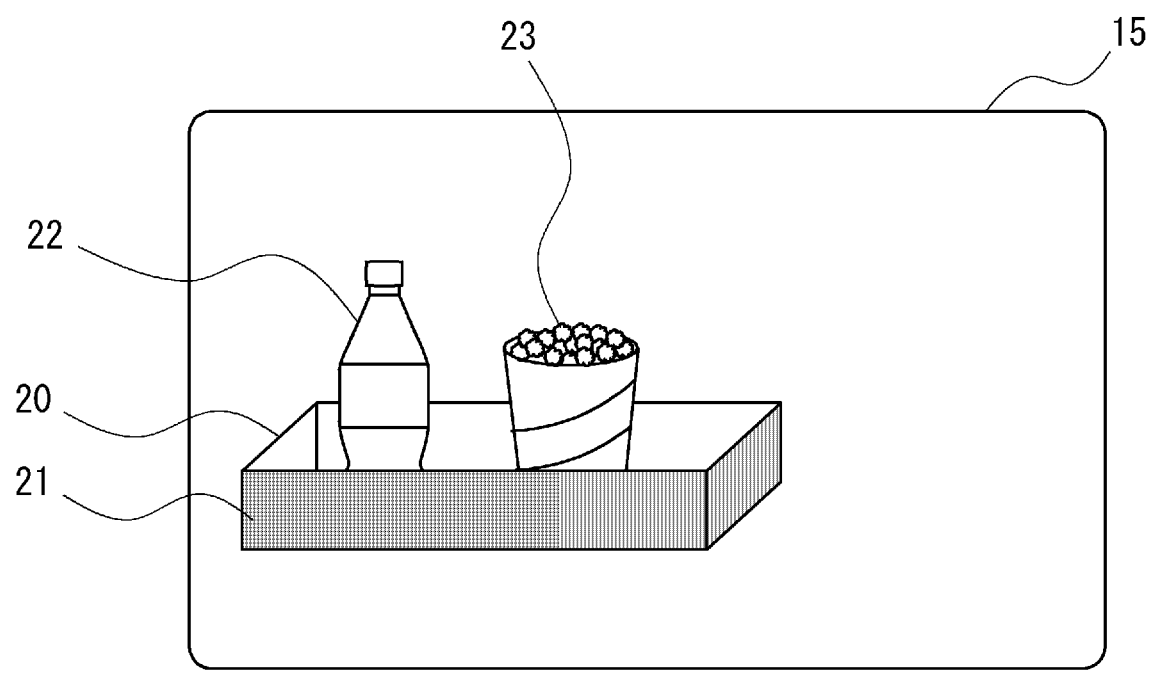
FIG. 11 is a drawing for explaining operations performed by the video display apparatus according to the second embodiment.

After that, as shown in FIG. 10, when the user's hand 33 is included within a predetermined range 32, and the switching control unit 14 has detected a gesture made by a user's hand 28, the switching control unit 14 switches the video image displayed in the video display unit 15 to the video image taken by the image pickup unit 11, i.e., the video image of the utensil 20, the drink 22 and the food 23 as shown in FIG. 11. Since the video image taken by the image pickup unit 11 is displayed in the video display unit 15 as described above, the user can eat and drink the food 23 and drink 22 placed on the utensil 20 while visually recognizing (i.e., seeing) them.

As shown in FIG. 9, in the video display apparatus according to this embodiment, when the user's hand 33 is detected in the shooting range of the image pickup unit 11, the video image taken by the image pickup unit 11 (the video image of the utensil 20 and the like) is displayed while being superimposed on the content video image 31. That is, instead of abruptly switching from the content video image 31 to the video image taken by the image pickup unit 11, these images are gradually switched from one to the other, so that the user can observe his/her hand with his/her eyes before making a gesture, and thereby can switch the video image more accurately.

Note that although the present disclosure is described as a hardware configuration in the above-described embodiments, the present disclosure is not limited to the hardware configurations. In the present disclosure, the control process performed in the video display apparatus can be implemented by causing a CPU (Central Processing Unit) to execute a computer program.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A video display apparatus comprising:
    a video display unit configured to display a video image in a field of view of a user;
    an image pickup unit configured to take a video image of a view in the viewing direction of the user, who is wearing the video display;
    a switching unit configured to selectively perform switching as to whether to display a first video image or a second video image on the video display unit, the first video image being a video image of a certain content, and the second video image being the video image taken by the image pickup unit and including an eating utensil object; and
    a switching control unit configured to control the switching unit,
    wherein the switching control unit displays the second video image while superimposing the second video image on the first video image when the switching control unit has detected a user's hand to have made a first predetermined gesture of an open hand gesture and an identification pattern on a sticker affixed to the eating utensil object, within a shooting range of the image pickup unit, and then the switching control unit switches the first video image to the second video image displayed on the video display unit when the switching control unit has detected that the user's hand has made a second predetermined gesture of a closed hand gesture, wherein the predetermined identification pattern is a specific identification pattern that is registered by machine learning in advance, wherein the predetermined range of the image pickup unit is set by using the specific identification pattern as a reference starting point of the predetermined range.

2. A method for controlling a video display apparatus comprising:

displaying a video image in a field of view of a user;

taking a video image of a view in the viewing direction of the user, who is wearing the video display;

switching a video image to be displayed in the field of view of the user to one of a first video image and a second video image, the first video image being a video image of a certain content, and the second video image being the video image taken by the image pickup unit and including an eating utensil object;

wherein the second video image is displayed while superimposing the second video image on the first video image when a user's hand is detected to have made a first predetermined gesture of an open hand gesture and an identification pattern on a sticker affixed to the eating utensil object, within a shooting range of the image pickup unit, and then the first video image is switched to the second video image displayed on the video display unit when it is detected that the user's hand has made a second predetermined gesture of a closed hand gesture, wherein the predetermined identification pattern is a specific identification pattern that is registered by machine learning in advance, wherein the predetermined range of the image pickup unit is set by using the specific identification pattern as a reference starting point of the predetermined range.

3. A non-transitory computer readable medium storing a program for causing a computer provided in a video display apparatus to perform processes comprising:

displaying a video image in a field of view of a user;

taking an image of a view in the viewing direction of the user, who is wearing the video display;

switching a video image to be displayed in the field of view of the user to one of a first video image and a second video image, the first video image being a video image of a certain content, and the second video image being the video image taken by the image pickup unit and including an eating utensil object;

wherein the second video image is displayed while superimposing the second video image on the first video image when a user's hand is detected to have made a first predetermined gesture of an open hand gesture and an identification pattern on a sticker affixed to the eating utensil object, within a shooting range of the image pickup unit, and then the first video image is switched to the second video image displayed on the video display unit when it is detected that the user's hand has made a second predetermined gesture of a closed hand gesture, wherein the predetermined identification pattern is a specific identification pattern that is registered by machine learning in advance, wherein the predetermined range of the image pickup unit is set by using the specific identification pattern as a reference starting point of the predetermined range.

* * * * *